(12) United States Patent
Wernevi et al.

(10) Patent No.: US 10,129,384 B2
(45) Date of Patent: Nov. 13, 2018

(54) AUTOMATIC DEVICE CONFIGURATION FOR EVENT DETECTION

(71) Applicant: NORDIC TECHNOLOGY GROUP INC., Providence, RI (US)

(72) Inventors: Erik Wernevi, Providence, RI (US); Joshua Napoli, Providence, RI (US)

( * ) Notice: Subject to any disclaimer, the term of this patent is extended or adjusted under 35 U.S.C. 154(b) by 0 days.

(21) Appl. No.: 14/869,846

(22) Filed: Sep. 29, 2015

(65) Prior Publication Data

US 2016/0094703 A1 Mar. 31, 2016

Related U.S. Application Data

(60) Provisional application No. 62/056,729, filed on Sep. 29, 2014, provisional application No. 62/056,742, filed on Sep. 29, 2014, provisional application No. 62/065,614, filed on Oct. 18, 2014, provisional application No. 62/094,030, filed on Dec. 18, 2014.

(51) Int. Cl.
| | |
|---|---|
| *H04M 11/00* | (2006.01) |
| *H04M 1/725* | (2006.01) |
| *H04B 1/3827* | (2015.01) |
| *H04W 4/021* | (2018.01) |
| *H04W 76/50* | (2018.01) |
| *G08B 21/04* | (2006.01) |

(52) U.S. Cl.
CPC .... *H04M 1/72538* (2013.01); *G08B 21/0407* (2013.01); *H04B 1/385* (2013.01); *H04W 4/021* (2013.01); *H04W 76/50* (2018.02); *H04B 2001/3855* (2013.01)

(58) Field of Classification Search
CPC ... H04M 1/72538; H04M 11/00; H04B 1/385; H04B 2001/3855; H04W 4/021; H04W 76/007; H04W 76/50; G08B 21/0407
USPC ........................................................ 455/404.2
See application file for complete search history.

(56) References Cited

U.S. PATENT DOCUMENTS

| | | | | |
|---|---|---|---|---|
| 5,537,102 A | * | 7/1996 | Pinnow | G01S 5/02 340/5.8 |
| 6,095,985 A | | 8/2000 | Raymond | |
| 6,108,685 A | | 8/2000 | Kutzik | |
| 6,201,476 B1 | | 3/2001 | Depeursinge | |
| 6,524,239 B1 | | 2/2003 | Reed | |
| 6,611,206 B2 | | 8/2003 | Eshelman | |
| 6,856,832 B1 | * | 2/2005 | Matsumura | A61B 5/0006 128/903 |
| 6,941,239 B2 | | 9/2005 | Unuma | |

(Continued)

OTHER PUBLICATIONS

Wu et al., "A Detection System for Human Abnormal Behavior," Projects No. CUHK 4163/03E.

(Continued)

*Primary Examiner* — Mong-Thuy Tran
(74) *Attorney, Agent, or Firm* — Locke Lord LLP

(57) ABSTRACT

A method in which an electronic device that has one or more movement sensors and a computer processor may detect events in a way that is convenient for daily use by a person. A behavior detection mode may be activated when the electronic device is physically attached to the torso of the person wherein the electronic device may be disposed in a special article (e.g. an article of manufacture, article of clothing, etc.) designed to be attached to the torso of the person so that it activates a behavior detection mode.

20 Claims, 14 Drawing Sheets

(56) References Cited

U.S. PATENT DOCUMENTS

| | | |
|---|---|---|
| 7,001,334 B2 | 2/2006 | Reed |
| 7,202,791 B2 | 4/2007 | Trajkovic |
| 7,369,680 B2 | 5/2008 | Trajkovic |
| 7,502,498 B2 | 3/2009 | Wen |
| 7,552,030 B2 | 6/2009 | Guralnik |
| 7,586,418 B2 | 9/2009 | Cuddihy |
| 7,589,637 B2 | 9/2009 | Bischoff |
| 7,847,682 B2* | 12/2010 | Jung .................. G06Q 10/00 340/522 |
| 7,905,832 B1* | 3/2011 | Lau .................. G06F 11/3013 128/920 |
| 7,937,461 B2 | 5/2011 | Kutzik |
| 8,120,498 B2 | 2/2012 | Dishong |
| 8,223,011 B2 | 7/2012 | Noury |
| 8,237,558 B2 | 8/2012 | Sayed Momen et al. |
| 8,321,532 B2 | 11/2012 | Kutzik |
| 8,890,937 B2 | 11/2014 | Skubic |
| 2004/0027246 A1* | 2/2004 | Aguglia .............. A61B 5/0002 340/573.1 |
| 2004/0223629 A1 | 11/2004 | Chang |
| 2005/0068169 A1* | 3/2005 | Copley .............. G08B 21/0283 340/539.13 |
| 2006/0218979 A1 | 10/2006 | Yu |
| 2006/0281979 A1* | 12/2006 | Kim .................. A61B 5/02 600/301 |
| 2007/0250286 A1* | 10/2007 | Duncan .............. A61B 5/1121 702/139 |
| 2007/0296571 A1 | 12/2007 | Kolen |
| 2008/0162088 A1* | 7/2008 | DeVaul .............. A61B 5/0024 702/190 |
| 2008/0266118 A1* | 10/2008 | Pierson .............. A61B 5/0205 340/573.6 |
| 2009/0048540 A1* | 2/2009 | Otto .................. A61B 5/1118 600/595 |
| 2009/0322513 A1* | 12/2009 | Hwang .............. A61B 5/02055 340/539.12 |
| 2010/0056872 A1* | 3/2010 | Kahn .................. A61B 5/1038 600/300 |
| 2010/0302043 A1 | 12/2010 | Skubic |
| 2011/0118613 A1* | 5/2011 | Yokoyama .......... A61B 5/022 600/486 |
| 2011/0295080 A1* | 12/2011 | Chen .................. A61B 5/02055 600/300 |
| 2012/0123277 A1* | 5/2012 | Blaha .................. G06K 9/00067 600/476 |
| 2012/0316406 A1* | 12/2012 | Rahman .............. G01C 22/006 600/301 |
| 2014/0233356 A1* | 8/2014 | Pattikonda .......... G04G 9/0064 368/13 |
| 2014/0235969 A1 | 8/2014 | Van Der Heide |
| 2014/0279740 A1* | 9/2014 | Wernevi .............. G06N 99/005 706/12 |
| 2015/0302310 A1* | 10/2015 | Wernevi .............. G16H 50/20 706/12 |
| 2016/0004393 A1* | 1/2016 | Faaborg .............. G06F 3/0482 715/765 |
| 2016/0089047 A1* | 3/2016 | Jonnada .............. A61B 5/04012 600/516 |

OTHER PUBLICATIONS

Cheng et al., Detection and Characterization of Anomalies in Multivariate Time Series, Proceedings of the 2009 SIAM Internaitonal Conference on Data Mining, 2009, in SDM, pp. 413-424.

Nixon et al., "Feature Extraction & Image Processing for Computer Vision," 3rd Edition, Academic Press, 2012, Oxford, UK.

Johnson et al., "Applied Multivariate Statistical Analysis," 6th Ed., Prentice Hall, 2007.

He et al., "Falling-Incident Detection and Alarm by Smartphone with Multimedia Messaging Service (MMS)", E-Health Telecommunication Systems and Networks, 2012, 1, 1-5.

Yang et al., "A Review of Accelerometry-Based Wearable Motion Detectors for Physical Activity Monitoring", Sensors 2010, 10, 7772-7788.

Kiryati et al., "Real-time Abnormal Motion Detection in Surveillance Video", ICPR 2008, pp. 4.

Ahmed et al., "On Use of Nominal Internal Model to Detect a Loss of Balance in a Maximal Forward Reach," J Neurophysiol. 2007, pp. 2439-2447.

Abbatea et al., "A Smartphone-based Fall Detection System," Pervasive and Mobile Computing, 2012 (8), pp. 883-889.

Anania et al., "Development of a Novel Algorithm for Human Fall Detection Using Wearable Sensors," IEEE Sesnors, 2008 Conference (4 pages).

Ning Jia, "Detecting Human Falls with a 3-Axis Digital Accelerometer," Analog Dialogue 43-07, Jul. 2009 (7 pages).

Habib et al., "Smartphone-Based Solutions for Fall Detection and Prevention: Challenges and Open Issues," Sensors 2014, 14, 7181-7208.

Igual et al., "Challenges, issues and trends in fall detection systems," BioMedical Engineering OnLine 2013, 12:66 (24 pages).

Mirelman et al., "Body-Fixed Sensors for Parkinson Disease," JAMA The Journal of the American Medical Association • Sep. 2015 [https://www.researchgate.net/publication/281483338] (3 pages).

Wilson et al., "Recognition and Interpretation of Parametric Gesture," M.I.T. Media Laboratory Perceptual Computing Section Technical Report No. 421 Submitted to: International Conference on Computer Vision, 1998 (8 pages).

Xu et al., "Exploring Techniques for Vision Based Human Activity Recognition: Methods, Systems, and Evaluation," Sensors 2013, 13, 1635-1650.

Pannurat et al., "Automatic Fall Monitoring: A Review," Sensors 2014, 14, 12900-12936.

Wu et al., "A Detection System for Human Abnormal Behavior," Projects No. CUHK 4163/03E, 2005.

* cited by examiner

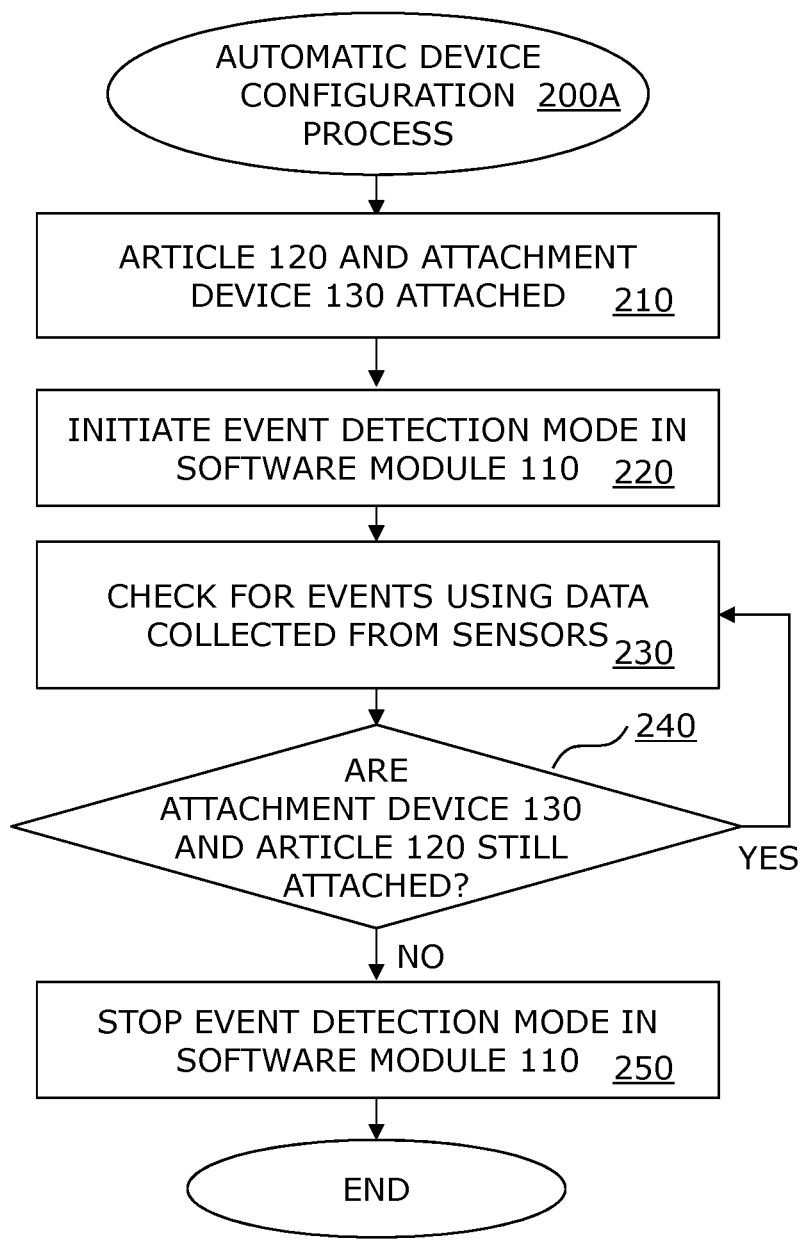

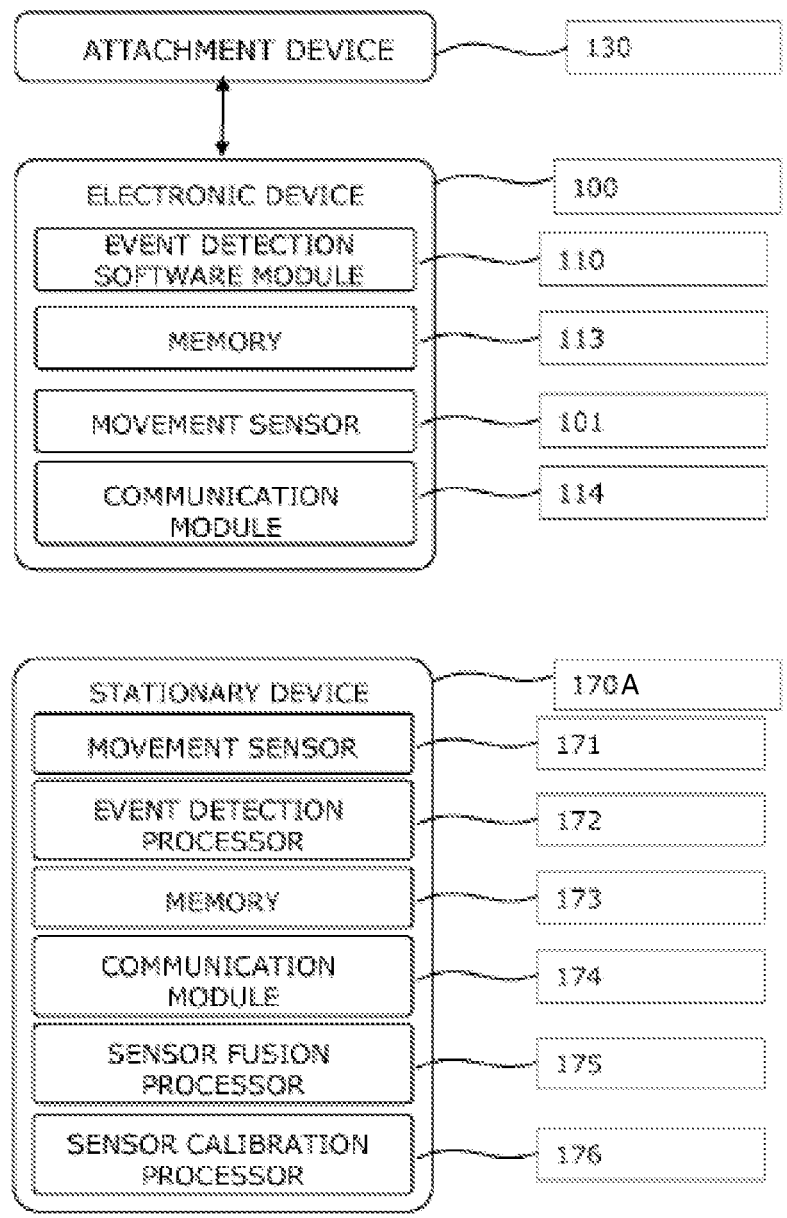

AUTOMATIC DEVICE CONFIGURATION FOR EVENT DETECTION

This application claims the benefit of each of the following U.S. Provisional Patent Application Ser. Nos. 62/056,729, filed Sep. 29, 2014, 62/056,742, filed Sep. 29, 2014, 62/065,614, filed Oct. 18, 2014, and 62/094,030, filed Dec. 18, 2014, the disclosures of each of the foregoing patent applications being incorporated herein by reference in their entirety.

BACKGROUND

Many older adults have trouble using wearable alarms. In emergencies it may be difficult for an older adult to call out for help, push an alarm button, or take some other action to summon help. In some situations, such as when a person has suffered a fall or other traumatic event (a so called "adverse event"), it may be too difficult, if not impossible, for the older adult to use any type of device that may require active participation by the older adult.

Many older adults have smartphones. However, many older adults have trouble using smartphones for a number of reasons including difficulty in using common smartphone features such as touch displays, small text, small buttons, etc. Especially, in emergencies it may be difficult for an older adult to place a timely call for help to the appropriate caregiver or emergency services. In some situations, such as when a person has suffered a fall or other traumatic health event (a so called "adverse event"), it may be too difficult, if not impossible, for the older adult to place the call to get help using any type of device that may require the active participation of the adult themselves. Smartphones have sensors and computing power that lend themselves to detecting adverse events, such as falls, prolonged inactivity, etc. However, initiating a smartphone app may be difficult, especially in an emergency.

Also, many smartphones would run out of battery power much too quickly if they were to continuously run a software module for fall detection that continuously polled the necessary sensors and processed the data in a timely fashion. As a result of these and other issues, there has been very little adoption of using smartphones for detection of abnormal behavior, such as falls, prolonged inactivity, etc.

Moreover, the operational time for many devices that are intended to be worn on people (so called "wearable devices") are limited due to battery energy constraints. Wearable devices that contain sensors, processors, displays, etc., often need to be recharged frequently, in some cases limiting their usefulness for some continuous types of processing (e.g. data collection, software operation, etc.).

In general, many people prefer not to have to wear a traditional safety alarm all the time, as it may be difficult to do in practice and may require cumbersome changes to a person's daily routine.

SUMMARY

A method in which an electronic device that has one or more movement sensors and a computer processor may detect abnormal behavior and adverse health events in a way that is convenient for daily use by a person. In one aspect, a behavior detection mode being activated when the electronic device is physically attached to the torso of the person. In an exemplary embodiment the electronic device is in a special article (e.g. an article of manufacture, article of clothing, etc.), that is designed to be attached to the torso of the person. When the special article is attached to the torso it activates a behavior detection mode. The attachment of the electronic device on the torso is helpful as the positioning of the electronic device aids the generation of reliable information on body parameters such as orientation and velocity that may be used by existing algorithms for reliable fall detection and collection of useful event data.

In an exemplary embodiment, the electronic device is a mobile phone that has movement sensors and computer processor, a so called "smartphone". In this variation the smartphone may become a very accurate fall detection device in a way that is convenient for daily use by a person. In an exemplary embodiment a fall detection mode is activated when the smartphone is physically attached to another device that is designed to be on the torso of the person. In an exemplary embodiment the smartphone is in a special case that is attached to a special clip. When the case is attached to the clip it activates the fall detection mode. In this variation the attachment of the smartphone on the torso is, again, helpful as the positioning of the device aids the generation of reliable information on body parameters such as orientation and velocity that may be used by existing algorithms for reliable fall detection.

In an exemplary embodiment, the software contains a subroutine to continuously deduce the likely type of activity being performed by the person based on movement profile. Based on the deduced activity the likelihood of the occurrence, or non-occurrence, of a possible future event is further computed. To conserve battery power the interval for the data collection and data processing is adapted to the activity performed by the person when different activity modes are detected, e.g. different time intervals when walking, driving a car, etc. In an exemplary embodiment, when an activity with low risk of falling (e.g. driving, lying still, etc.) is detected the data collection and data processing is adapted to conserve energy (e.g. only sensors that use little power are used, sensors are polled at less frequent intervals, etc.).

In an exemplary embodiment, the electronic device is either a device that the person may wear, or it is designed to be attached, or worn, as a part of an article of clothing, or manufacture, that the person may wear. In this embodiment the data generated by the electronic device, that has the capability to sense if it is worn by a person, is combined with data generated from a stationary device that is monitoring an area that the person sometimes inhabit. If the electronic device is detected as worn and the electronic device is inside the area that is monitored by the stationary device, then the data generated by the worn sensors and stationary sensors is fused. The fused data is used to detect adverse health events and may be used in order to calibrate sensor data gathered from the electronic device. If the electronic device is detected as worn and the electronic device is outside the area that is monitored by the stationary sensor, then an automatic adverse event alert mode in the electronic device is activated. Using this approach the person monitored is free to simply go about their daily activities without having to change their routines.

While there are numerous advantages to various embodiments, five exemplary advantages include: 1) ensuring that electronic device is affixed to the person's torso to facilitate accurate collection of movement data, from movement sensors in the electronic device, about the person's movements; 2) facilitate data collection about the orientation of the person's torso; 3) making it possible to distinguish when the electronic device is worn, or not worn, to avoid false alarms;

4) avoiding excessive battery drain; and 5) requiring no change to the monitored person's daily routine.

DESCRIPTION OF THE DRAWINGS

In the Drawing, in which like reference designations indicate like elements.

In the drawings like characters of reference indicate corresponding parts in the different and/or interrelated figures.

DETAILED DESCRIPTION

Exemplary embodiments of the present invention will now be described in detail with reference to the accompanying figures. The following section provides general and specific examples of aspects of embodiments.

Figure 1:
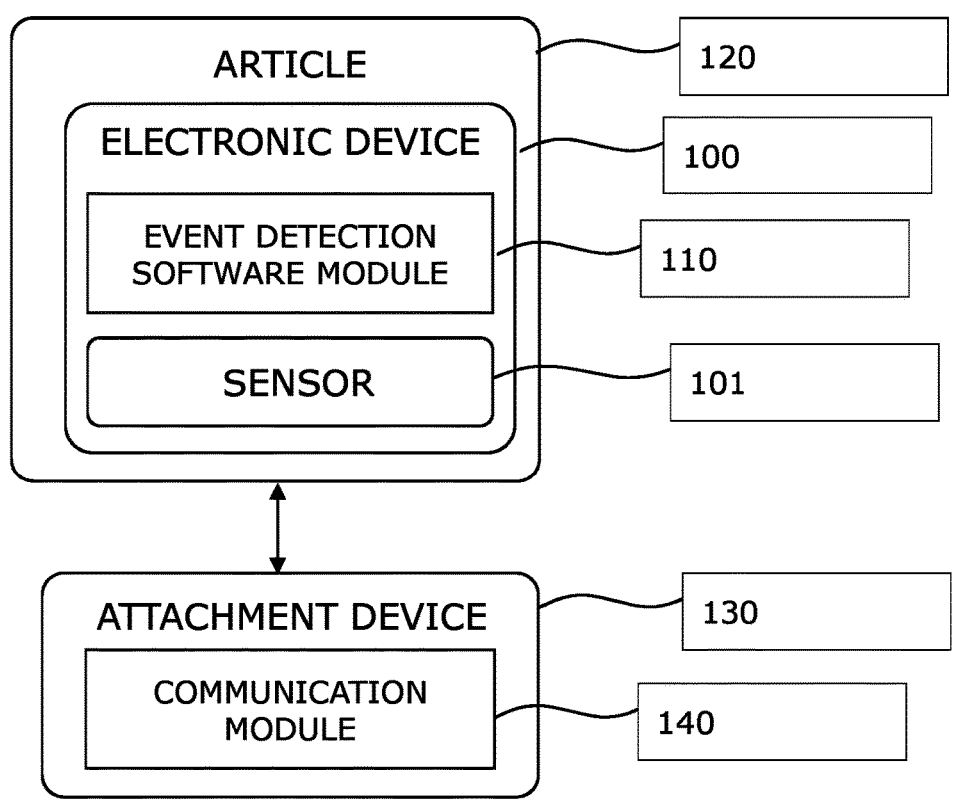
FIG. 1 A-F illustrates exemplary variations of the monitoring system according to exemplary embodiments of the present invention.
Figure 1:
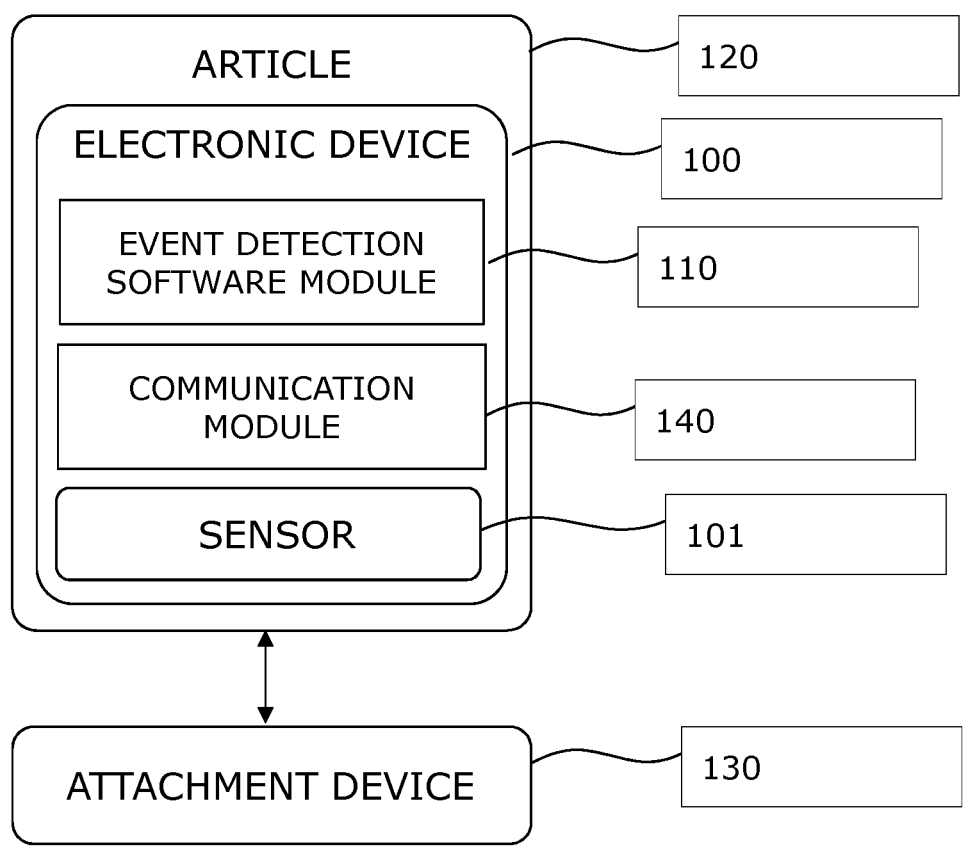
Figure 1C:
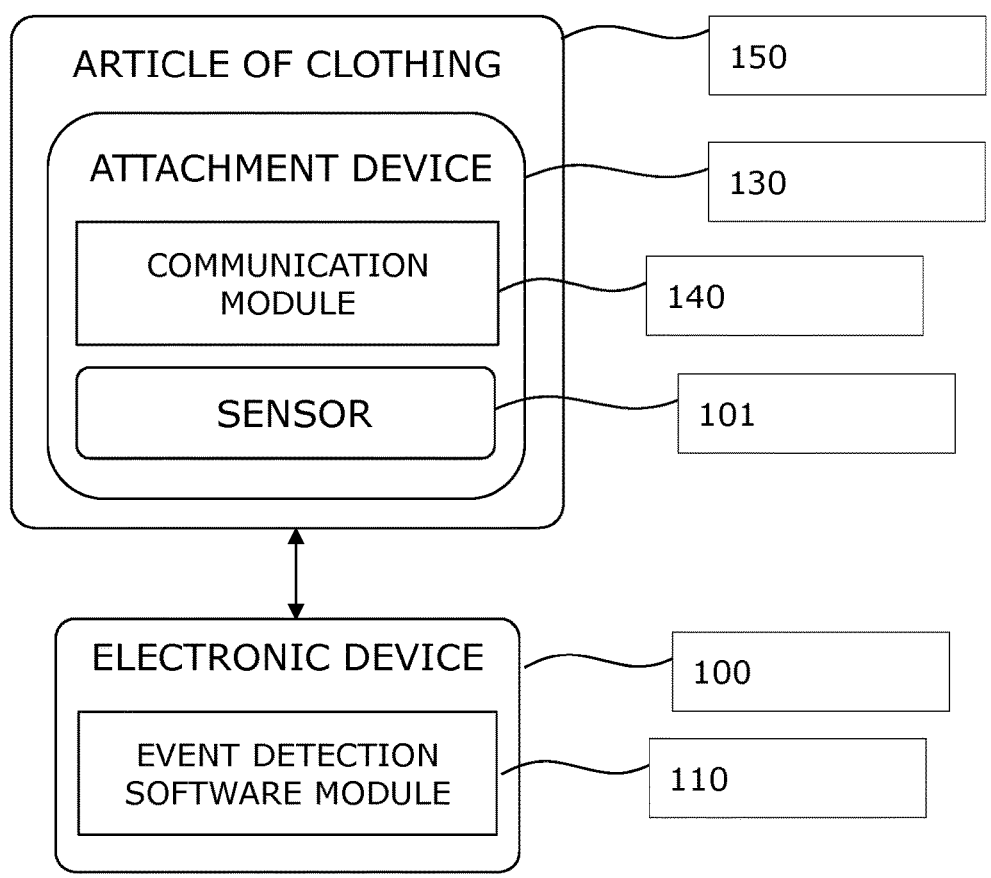
Figure 1D:
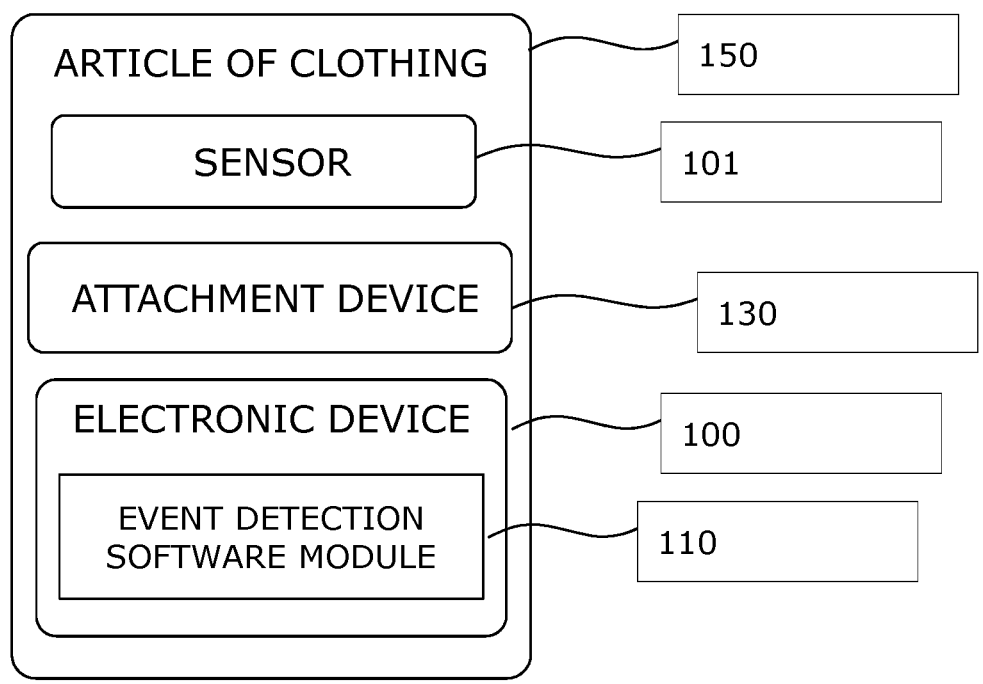
Figure 1E:
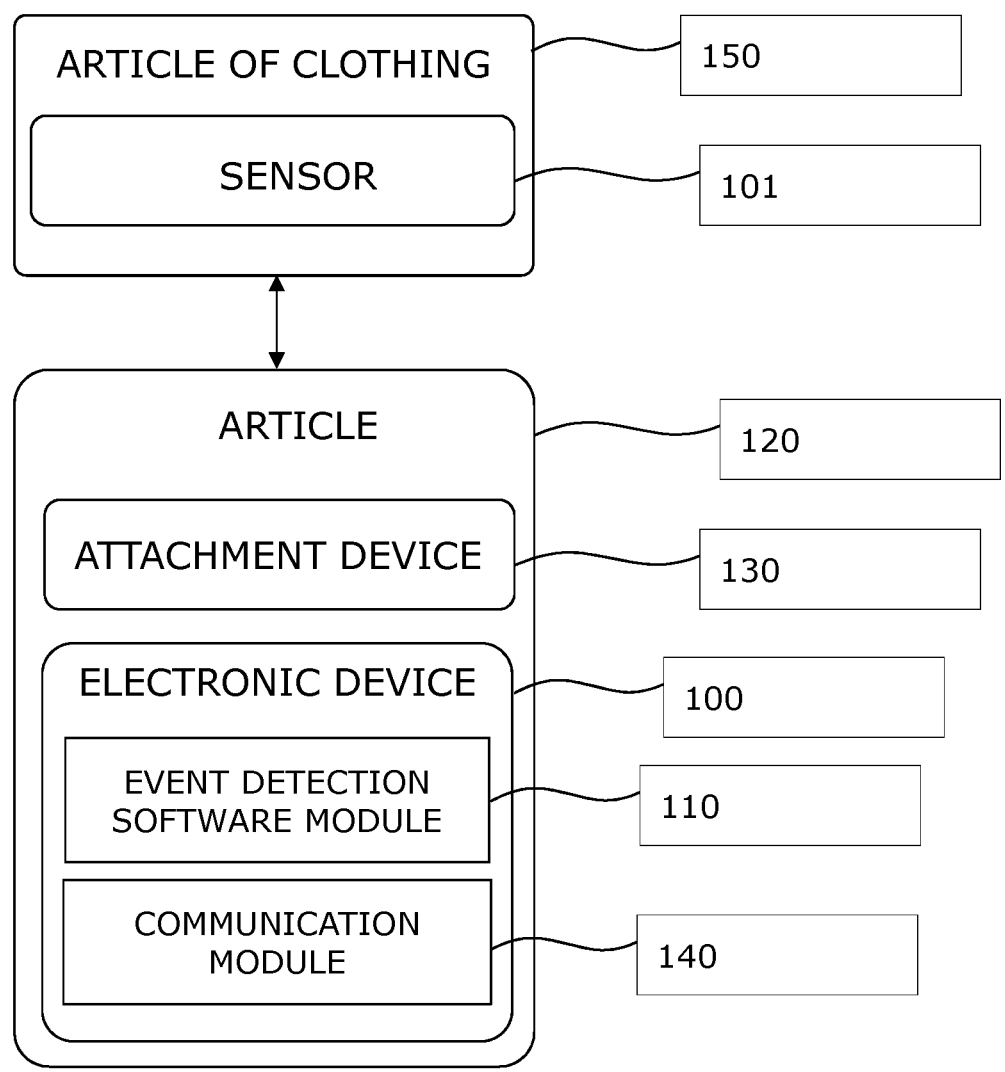
Figure 1F:
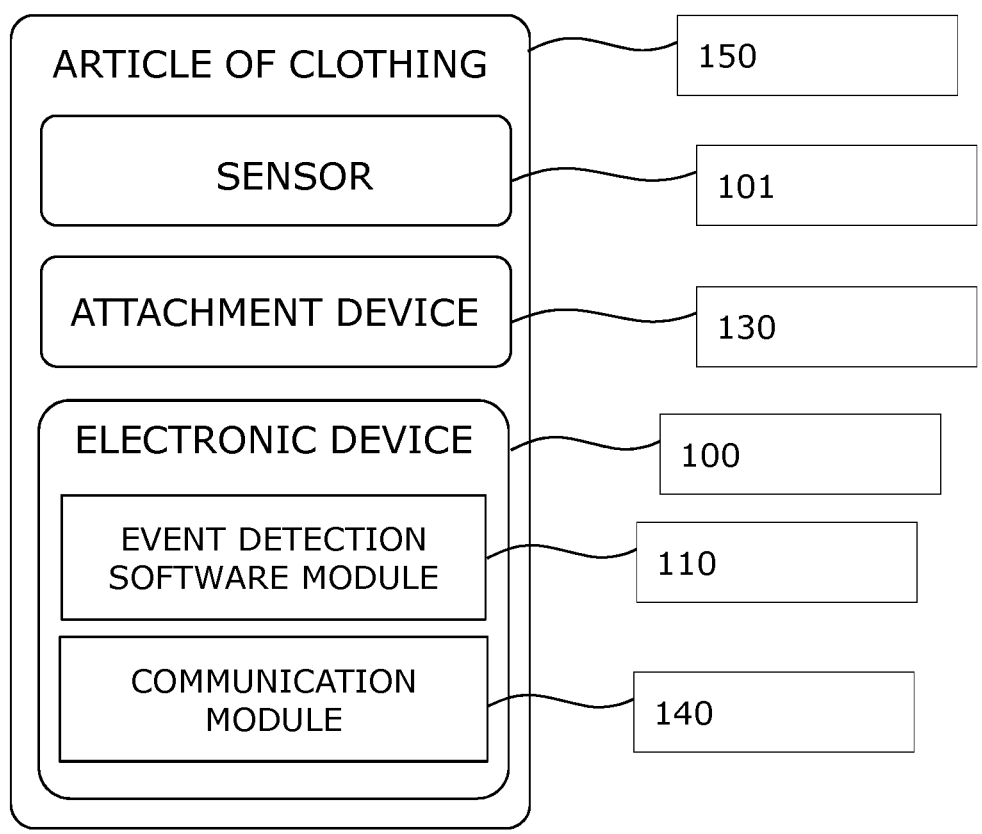

FIG. 1 A depicts an exemplary embodiment where an event detection software module 110 has been loaded onto an electronic device 100. In an exemplary embodiment software module 110 uses movement data collected from sensor 101 to detect events (e.g. falls, excessive time in an uncommon position for the electronic device, etc.). Events are used by the software module 110 as evidence of normal behavior or abnormal behavior. Electronic device 100 is inside, or placed in, an article 120 (e.g. an article of manufacture, an article of clothing, etc.). The article 120 is constructed to be easily attached (e.g. fitted, connected, hooked, slid etc.) to an attachment device 130. The attachment device 130 contains a control mechanism. The action of attaching, or detaching, the article 120 to attachment device 130 controls the activation, or deactivation, in software module 110 of the event detection mode where movement/non-movement events (e.g. falls, inactivity, etc.) are to be detected. In an exemplary embodiment the attachment device 130 is designed to be attached to article 120 where article 120 is an article of clothing (e.g. a belt, cord, seam etc.) that is designed to be on the torso of the person. In an exemplary embodiment the attachment device 130 contains a communication module 140 (e.g. a passive RFID tag, a Bluetooth transmitter, etc.). In an exemplary embodiment the communication module 140 sends a signal that initiates the event detection in software module 110 when electronic device 100 and attachment device 130 is within a pre-specified distance (e.g. when article 120 is attached to attachment device 130, when article 120 is a short distance from attachment device 130 etc.). In an exemplary embodiment said event detection software module 110 runs continuously for as long as article 120 is attached to attachment device 130.

Numerous variations, that may be applied to embodiments individually or in any combination where they may logically be combined are now described.

FIG. 1 B depicts an exemplary device configuration where the electronic device 100 contains the communication module 140. In this embodiment the communication module 140 activates the event detection in software module 110, that is on electronic device 100, when the electronic device 100 and the attachment device 130 are within a pre-specified distance (e.g. when article 120 and attachment device 130 are attached, when article 120 and attachment device 130 are close, etc.).

FIG. 1 C depicts an exemplary device configuration where an article of clothing 150 contains attachment device 130, and the communication module 140. In this exemplary variation the sensor 101 and communication module 140 are inside the attachment device 130. The data collected by sensor 101 is relayed to the electronic device 100 through the communication module 140. In this embodiment the communication module 140 activates the event detection in software module 110, that is on the electronic device 100, when electronic device 100 and article of clothing 150 is within a pre-specified distance (e.g. when electronic device 100 and article of clothing 150 are attached, when electronic device 100 and article of clothing 150 are close, etc.).

FIG. 1 D depicts an exemplary device configuration where article of clothing 150 contains electronic device 100 and attachment device 130. In this exemplary variation the sensor 101 is part of the article of clothing 150. In this embodiment variation the sensor 101 and attachment device are in contact with electronic device 100. In this embodiment the attachment device 130 activates the event detection in software module 110, that is on the electronic device 100, when attachment device 130 is used to attach the article of clothing 150 to the person (e.g. when article of clothing 150 is buttoned, strapped on, etc.).

FIG. 1 E depicts an exemplary device configuration where article of clothing 150 contains sensors 101 and where article 120 contains electronic device 100 and attachment device 130. In this exemplary embodiment sensors 101 are embedded in the article of clothing 150 (e.g. movement sensors, fibers that change resistance, etc.). In this embodiment the attachment device 130 activates the event detection in software module 110, that is on the electronic device 100, when attachment device 130 is used to attach the article 120 to article of clothing 150 (e.g. when attachment device 130 is used to button, close, zip, etc., article 120 together with article of clothing 150).

FIG. 1 F depicts an exemplary device configuration where article of clothing 150 contains electronic device 100, sensors 101, and attachment device 130. In this exemplary embodiment one or more sensors 101 are embedded in the article of clothing 150 (e.g. movement sensors, fibers that change resistance, etc.). In this embodiment the attachment device 130 activates the event detection in software module 110, that is on the electronic device 100, when attachment device 130 is used to attach article of clothing 150 to the person (e.g. when attachment device 130 is used to button, close, zip, etc., article of clothing 150).

In an exemplary embodiment, any of the illustrative embodiments of FIG. 1 A-F achieve one, or more, of the objectives of: 1) ensuring that electronic device 100 is affixed to the person's torso to facilitate accurate collection of movement data, from movement sensors in electronic device 100, about the person's movements; 2) facilitate data collection about the orientation of the person's torso; and 3) making it possible to distinguish when the electronic device is worn, or not worn, to avoid false alarms and excessive battery drain.

Figure 2:
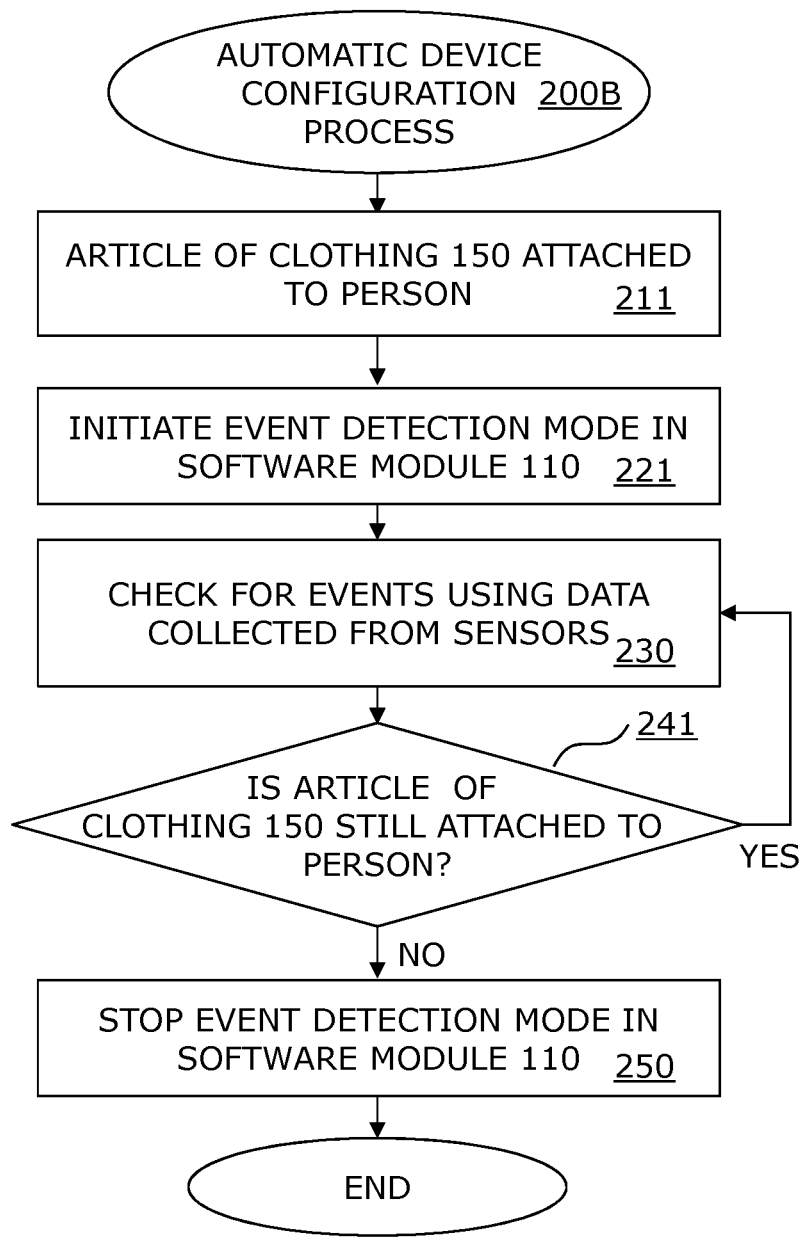
FIG. 2 A-B illustrates flow charts for exemplary implementation of the monitoring process of FIG. 1.

FIG. 2 A shows an exemplary automatic device configuration process 200A that may be practiced with the device in FIG. 1. In step 210 article 120 and attachment device 130 are attached together. In step 220 the attachment of article 120 and attachment device 130 initiates the event detection mode in software module 110 in electronic device 100. In step 230 the event detection mode checks for events using data collected from sensors 101. In step 240 the attachment device 130 checks that it is still attached to article 120. If it is attached, then the process goes back to step 230. If it is not attached, then the process continues to step 250. In step 250 the detachment of attachment device 130 and article 120 stops the event detection mode.

FIG. 2 B shows an exemplary variation 200B of the automatic device configuration process 200 that may be practiced with the device in FIG. 1. In step 211 article of clothing 150 is attached to the person. In step 221, In an exemplary embodiment, attachment device 130 detects the attachment of the article of clothing in step 211 and initiates the event detection mode in software module 110 in electronic device 100. In step 230 the event detection mode checks for events using data collected from sensors 101. In step 241 the attachment device 130 checks that it is still attached to the person. In an exemplary embodiment, the check may consist of determining whether attachment device 130 is still attached (e.g. buttoned, zipped, closed, etc.). If it is attached, then the process goes back to step 230. If it is not attached, then the process continues to step 250. In step 250 the detachment of attachment device 130 and article 120 stops the event detection mode.

Figure 3:
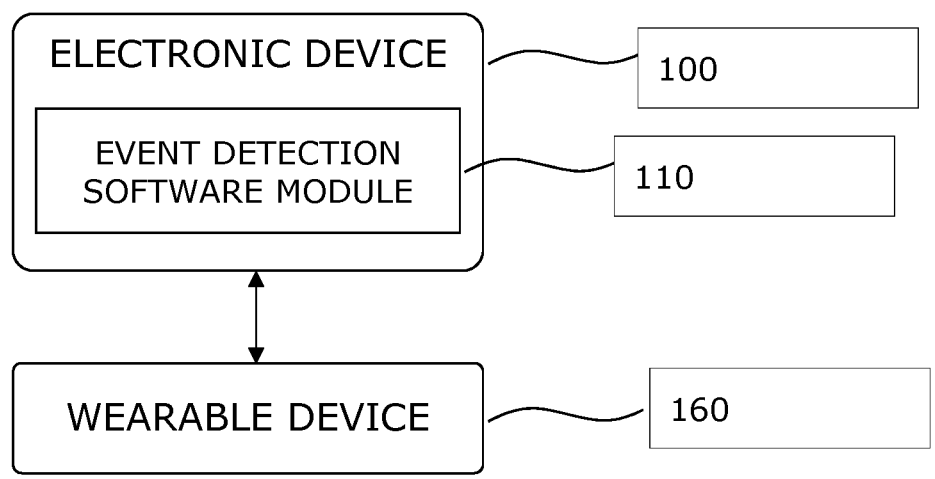
FIG. 3 illustrates an exemplary variation of the monitoring system together with a wearable device.
Figure 4:
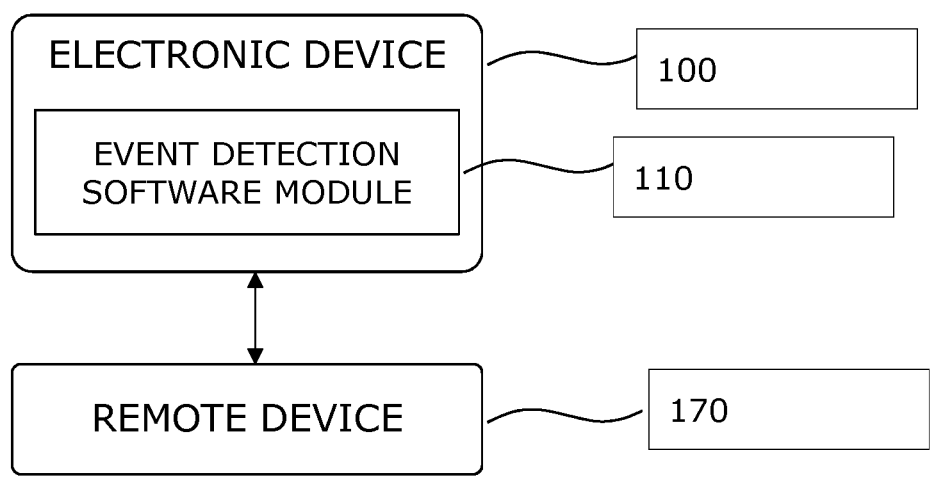
FIG. 4 illustrates an exemplary variation of the monitoring system where the system is in contact with a remote device.
Figure 5:
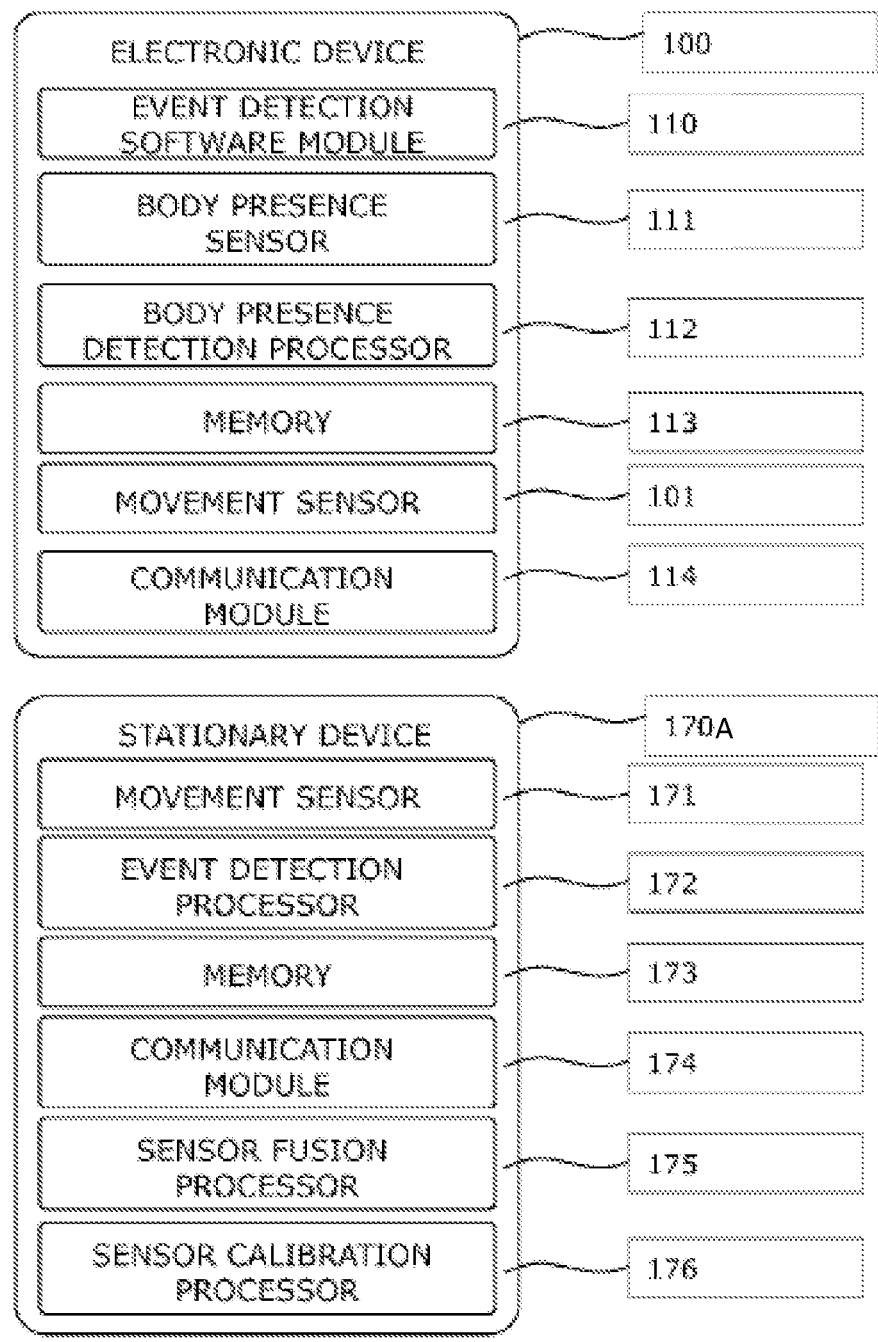
FIG. 5 A-B illustrates exemplary variations of the monitoring system where the system is contact with a stationary device that contains stationary sensors.
Figure 6:
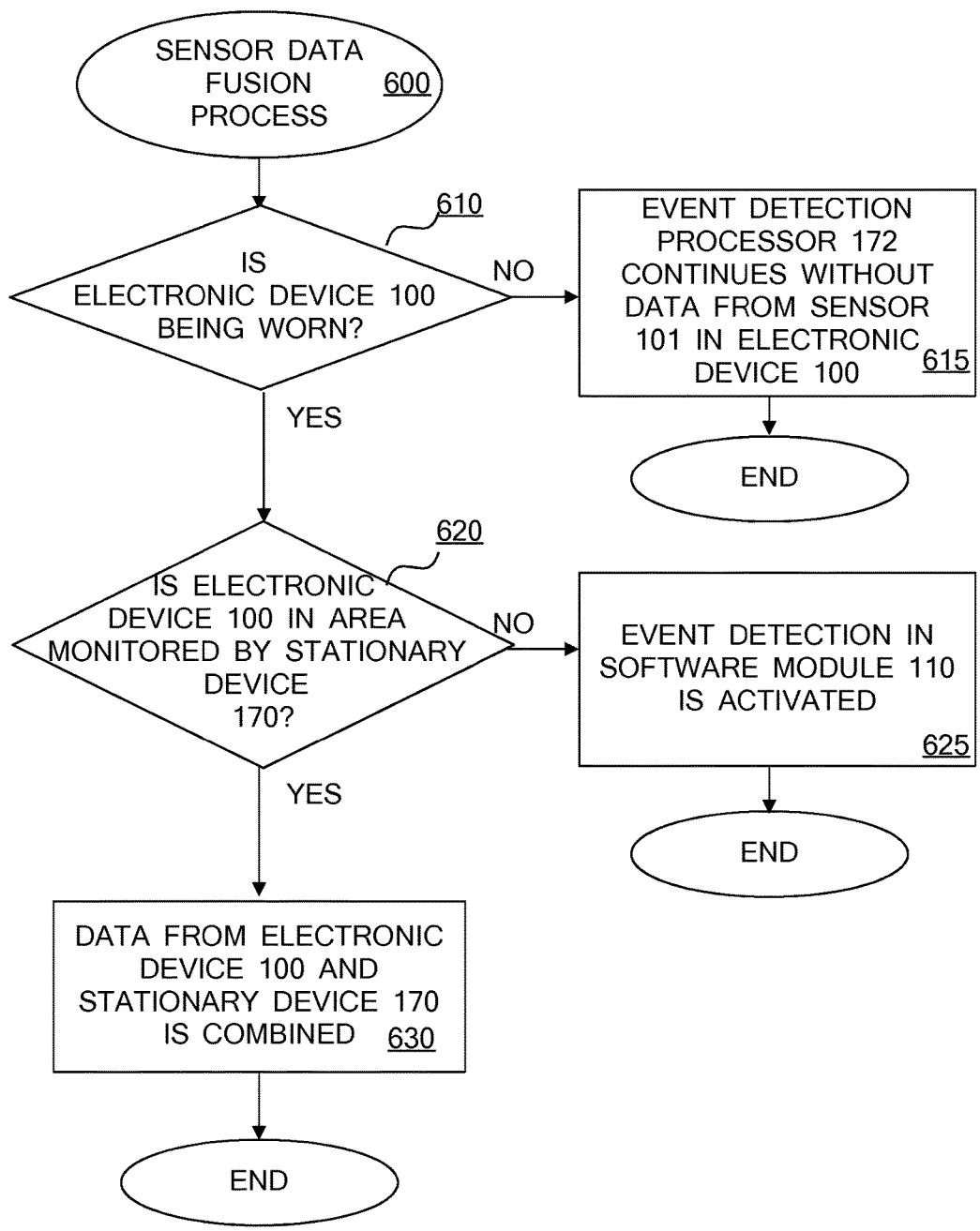
FIG. 6 illustrates a flow chart for an exemplary implementation of the sensor data fusion process that may be practiced with the monitoring system of FIG. 5 A-B.
Figure 7:
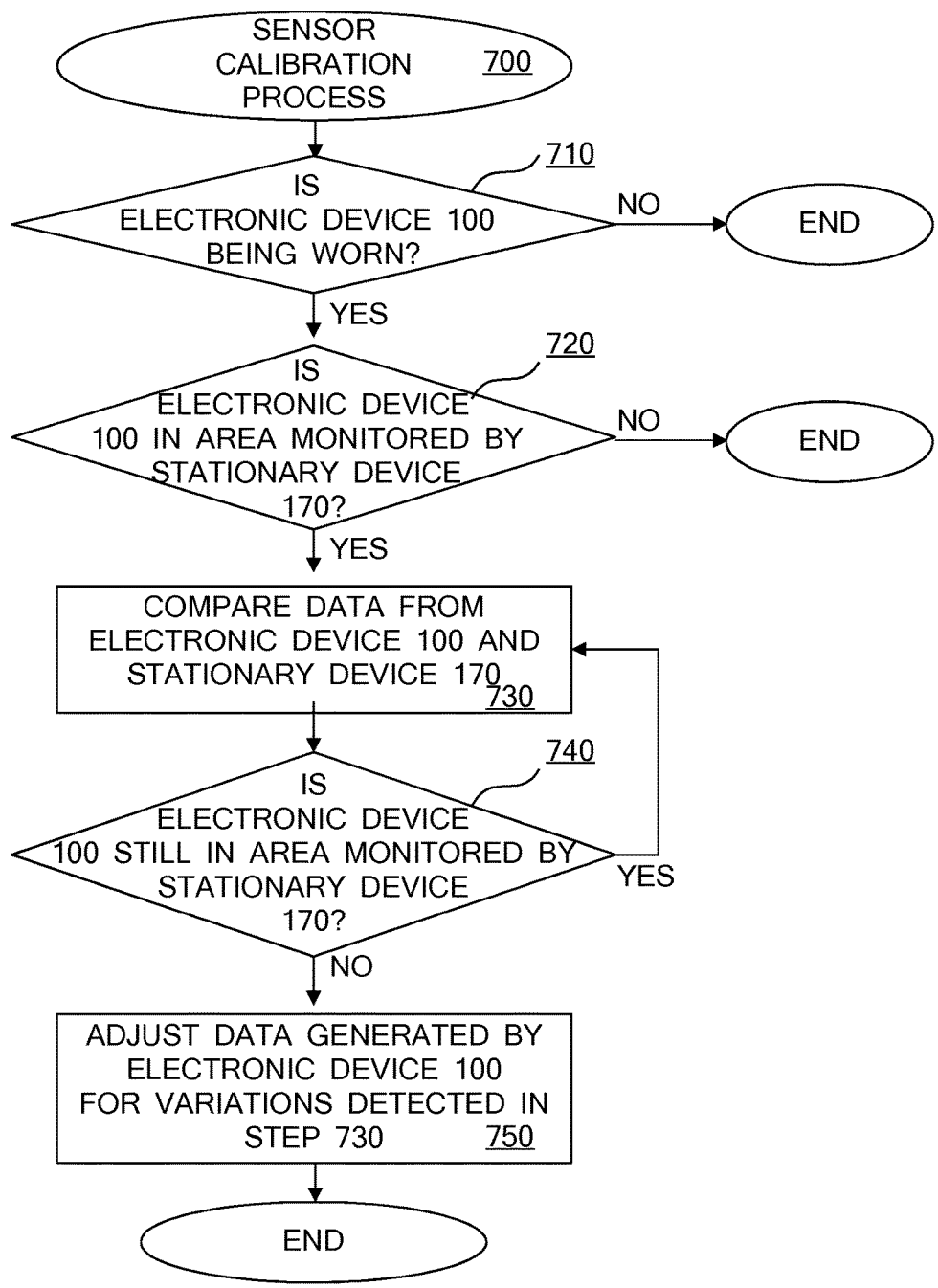
FIG. 7 illustrates a flow chart for an exemplary implementation of the sensor calibration process that may be practiced with the monitoring system of FIG. 5 A-B.

The exemplary attachment processes 200A and 200B may varied by replacing, or adding: 1) other devices, or articles, as described in FIG. 1 A-F, FIG. 3, FIG. 4, FIG. 5 A-B, FIG. 6, and FIG. 7; or 2) other variations described in this application wherever logically appropriate.

In an exemplary embodiment, the software module 110 is designed to detect adverse health events.

In an exemplary embodiment, the software module 110 is designed specifically to detect falls.

In an exemplary embodiment, the sensor data analyzed by software module 110 that is collected from one or more sensors 101 includes one, or more, non-movement health parameters (e.g. pulse, temperature, blood pressure, blood sugar, etc.).

In an exemplary embodiment, the article 120 is an article of clothing (e.g. a pair of trousers, a belt, a shirt, a skirt, etc.).

In an exemplary embodiment, the article 120 is an article of manufacture (e.g. a case, a holster, a device, etc.).

In an exemplary embodiment, the attachment device 130 is a piece of an article of clothing that is used to attach the article of clothing 120 to the person's body (e.g. a button, a strap, etc.). When the article of clothing 120 is attached to the body then the attachment device 130 triggers the event detection mode to be activated in software module 110. In an exemplary embodiment, the attachment closes, or opens, an on/off switch mechanism e.g. mechanical switch, electronic switch, etc.

In an exemplary embodiment, the attachment device 130 is a piece of an article of clothing that is used to secure the electronic device to the person (e.g. a pocket, a Velcro strap, etc.). As long as the article of clothing 120 is securing the attachment device 130 to the person it keeps the event detection mode activated in software module 110. In an exemplary embodiment, the attachment closes, or opens, an on/off switch mechanism e.g. mechanical switch, electronic switch, etc.

In an exemplary embodiment, the attachment device 130 controls the event detection mode in software module 110.

In an exemplary embodiment, the article 120 controls the event detection mode in software module 110.

In an exemplary embodiment, the communication module 140 has a power efficient communication mechanism for communicating at short distance e.g. through RFID, low powered Bluetooth, etc.

In an exemplary embodiment, the communication module 140 is equipped to relay data or voice communication from the electronic device 100 using wireless communication e.g. WiFi, cellular, etc.

In an exemplary embodiment, the article of clothing 150 has a natural placement on the person's torso e.g. it is a pair of trousers, a belt, a shirt, a skirt etc.

In an exemplary embodiment, the article of clothing 150 holds one, or more, sensor 101 in place on the torso.

In an exemplary embodiment, the article of clothing 150 has sensors that are automatically activated when the person puts on the article of clothing e.g. as fibers in clothing stretch, material is heated up, etc.

In an exemplary embodiment, the event detection software module 110 is designed to run passively in the background of electronic device 100 for as long as the electronic device 100 is attached to attachment device 130. In an exemplary embodiment, when running in the event detection mode the software module 110 continuously collects readings from one or more sensors 101 for one or more parameters such as velocity (i.e. speed and direction), orientation, horizontal location, vertical height, time of observation, etc. These are used in order to deduce body movement parameters (e.g. orientation, velocity, location, etc.). In an exemplary embodiment the readings for the parameters are collected from one or more sensors 101 (e.g. accelerometer, barometer, gyroscope, magnetometer, gps, etc.).

FIG. 3 shows an exemplary variation where some of the sensor data that is processed by software module 110 comes not from the electronic device but from a different device 160 that is worn by the person (a so called "wearable device", e.g. a smartwatch, a heart rate monitor, a glucose meter, etc.). Wearable device 160 contains sensors and is in communication with electronic device 100.

In an exemplary embodiment, the wearable device 160 is designed to always be worn by the person.

In an exemplary embodiment, wearable device 160 contains a control function that may be used to control electronic device 100 (e.g. to start event detection mode if it has not been initiated, to initiate a call for help, etc.).

In an exemplary embodiment, the attachment device 130 and/or the article 120 are designed to be attached in different fixed positions in relation to each other and/or in relation to the article of clothing 150 (for example by use of a specially designed pocket, a special strap etc.). Each fixed position achieves the objective of reducing the degrees of freedom between the electronic device and the axis of the torso of the person.

In another exemplary embodiment, the approximate alignment of the electronic device on the torso is automatically deduced by the event detection software module 110 by studying the movement profile within pre-specified time intervals (e.g. 1 min, 10 min, etc.).

In another exemplary embodiment, the event detection software module 110 determines latitudinal and longitudinal data using data generated from sensors 101 (e.g. GPS, accelerometer, etc.).

In another exemplary embodiment, the event detection software module 110 determines relative elevation and height information using data generated from sensors 101 (e.g. barometer, accelerometer, etc.).

In an exemplary embodiment, the attachment device 130 is attached not to the torso, but to a limb of the person (e.g. an arm, leg, etc.) to aid generation and analysis of movement data.

In an exemplary embodiment, one or more sensors 101 are attached not to the torso, but to one or more limbs of the person (e.g. an aim, leg, etc.) to aid generation and analysis of movement data.

FIG. 4 depicts an exemplary variation, where when an event is detected, software module 110 on electronic device 100 automatically alerts a remote device 170 (e.g. a phone, a computer, etc.) of the event. In an exemplary embodiment, remote device 170 may be in a different location than electronic device 100, e.g. in a remote call center, in a different room, etc. Remote device 170 automatically initiates a communication with electronic device 100 (e.g. a call, an sms, etc.). The communication is designed to check whether the wearer of electronic device 100 is in need of any kind of assistance from another party (e.g. emergency services, a caregiver, etc.). In an exemplary embodiment, the communication may be done without the wearer of electronic device 100 having to touch the electronic device 100 (e.g. by communicating using speakers, microphone, etc.).

In an exemplary embodiment, when an event is detected, the electronic device 100 first gives an alert (e.g. a prerecorded message, buzzing, etc.) to alert the wearer that it has detected an event. In an exemplary embodiment, the alert may be in the form of a question (e.g. "are you ok?", "do you need help?", etc.), that the wearer may easily respond to with a verbal short answer (e.g. "I need help", "Yes", etc.) or by touching (e.g. by pushing a button, by touching a display, etc.) the electronic device 100, the article 120, the attachment device 130, or the wearable device 160. The software module 110 will, when it is appropriate, either alert a remote device 170 that the wearer of the electronic device is in need of help from another party (e.g. the emergency services, a caregiver, etc.) or simply pass on the electronic device wearer's answer to another party (e.g. a call center, a caregiver, etc.) for further assessment. In an exemplary embodiment, the software on the electronic device 100 will log the event and the response as well as send the recorded data to remote device 170 (e.g. a phone, computer etc.), as in FIG. 4.

In an exemplary embodiment, the person wearing the electronic device may perform the exemplary communication above through another wearable device 160 that he or she is also wearing (e.g. a watch, pendent, etc.), as in FIG. 3.

In an exemplary embodiment, software module 110 is designed to run passively in the background of the electronic device 100. In an exemplary embodiment the software module 110 contains a subroutine to continuously deduce the likely type of activity being performed by the person based on movement profile. Based on the deduced activity the likelihood of the occurrence, or non-occurrence, of a possible future event is further computed. To conserve battery power the interval for the data collection and data processing is adapted to the activity performed by the person when different activity modes are detected, e.g. different time intervals when walking, driving a car, etc. In an exemplary embodiment, when an activity with low risk of falling (e.g. driving, lying still etc.) is detected the data collection and data processing is adapted to conserve energy (e.g. only sensors that use little power are used, sensors are polled at less frequent intervals etc.).

In an exemplary embodiment, the deduction of the likelihood of the occurrence, or non-occurrence of an event is done based on the location of the person.

In an exemplary embodiment, the software module 100 has the ability to go into a hibernation mode when it receives a predetermined signal that functions as an instruction to begin hibernation. In an exemplary embodiment, the hibernation mode continues only software processes that utilizes little power. In the hibernation mode all, or in some cases almost all, operations stop until the software again receives another signal to begin normal operational mode. The signal to begin, and end, hibernation mode may in an exemplary embodiment, be based on location or position of the device.

In an exemplary embodiment, the device worn by a person is a phone that has sensors and a computer processor (a so called "smartphone").

In an exemplary embodiment, the device worn by a person is a watch that has sensors and a computer processor (a so called "smartwatch").

In an exemplary embodiment, the calculation of when to conserve energy is done by trading off the likelihood of an event to occur versus the need for longer operational performance by maximizing a utility function based on expected outcomes.

FIG. 5 A-B shows exemplary variations in which a stationary device 170A that contains a stationary movement sensor 171 that complements the data collection by sensor 101. In an exemplary embodiment, the stationary device 170A has a movement sensor 171, e.g. a camera, infrared motion sensor, radar, etc., or any other suitable sensor that may be used to observe a person's movement. Whenever the electronic device 100 enters the particular area, i.e. the area that is observed by the movement sensor 171 in stationary device 170A, the event detection software module 110 enters into a low-power consumption mode.

In FIG. 5A event detection software module 110 monitors sensors 101 (e.g. accelerometer, magnetometer, etc.) that collect data on movements by the person and stores the data in memory 173. In an exemplary embodiment, electronic device 100 is constructed to be easily attached (e.g. fitted, connected, hooked, slid etc.) to an attachment device 130. The attachment device 130 contains a control mechanism. The action of attaching, or detaching, the electronic device 100 to attachment device 130 controls the activation, or deactivation, in software module 110 of the event detection mode where movement/non-movement events (e.g. falls, inactivity, etc.) are to be detected. Stationary device 170A monitors the area sometimes inhabited by the person with a stationary movement sensor 171 e.g. a camera, infrared motion sensor, etc. Sensor 171 continuously transmits the information to event detection processor 172 which stores data in memory 173. Electronic device 100 contains a communication module 114 that transmits the information from sensors 101 and event detection software module 110 to the communication module 174 in stationary device 170A. A sensor fusion processor 175 combines the data gathered by sensor 101, sensor 171, electronic device 100, stationary device 170A, etc. The fused data is used by event detection software module 110 and 172 as well as by a sensor calibration processor 176.

FIG. 5 B illustrates an exemplary variation of the monitoring system described above in reference to FIG. 5 A, where the electronic device 100 further, contains a body presence detection processor 112 that may determine if electronic device 100 is worn by a person. In this exemplary embodiment body presence detection processor 112 collects data from a body presence sensor 111 that may generate data (e.g. temperature, pulse, oxygen level, blood sugar, etc.) which may be used to determine if electronic device 110 is worn by a person. In an exemplary embodiment, body presence detection process 112 checks at regular intervals (e.g. 5 seconds, 1 minute, etc.) if electronic device 100 is being worn by the person and stores the information in memory 173.

FIG. 6 shows an exemplary variation 600 of the sensor data fusion process 600 performed by sensor fusion processor 175 that may be practiced with the exemplary variation of the monitoring system depicted in FIG. 5 A-B. In step 610 it is determined if electronic device 100 is worn by a person. If the electronic device 100 is not worn, then the event detection processor 172 of stationary device 170A continues without the data from electronic device 100 in step 615. If wearable device 100 is worn, then the sensor data fusion process proceeds to step 620. In step 620 the location of wearable device 100 in relation to stationary device 170A is determined. If wearable device 100 is outside the area monitored by stationary device 170A, then the event detection software module 110 in electronic device 100 is automatically activated in step 625. The activation of event detection software module 110 may be initiated by a communication from the stationary device 170A or by a sub-routine in event detection software module 110. If electronic device 100 is inside the area monitored by stationary device 170A, then the data gathered from both devices is combined in step 630.

FIG. 7 outlines an exemplary embodiment of the sensor calibration process 700 performed by sensor calibration processor 176 that may be practiced with the exemplary variation of the monitoring system depicted in FIG. 5 A-B. In step 710 it is determined if electronic device 100 is worn by a person. If electronic device 100 is worn, then the process proceeds to step 720, if not then the sensor calibration process ends. In step 720 the location of electronic device 100 in relation to stationary device 110 is determined. If electronic device 100 is outside the area monitored by stationary device 170A, then the sensor calibration process ends. If electronic device 100 is inside the area monitored by stationary device 170A, then the data gathered from both devices is compared in step 730. In step 730 the data from stationary sensors and wearable sensors at time period t, t+1, t+2, etc. are compared to identify temporary variations in sensor data generated by electronic device 100. The temporary variations may be due to how electronic device 100 is worn, variations in gait, etc. In step 740 the process determines if the electronic device 100 is still in the area monitored by stationary device 110. The calibration in step 730 continues for as long as electronic device 100 is still in the area monitored by stationary device 110. When electronic device 100 is no longer in the area monitored by the stationary device 110, then the sensor calibration process continues to step 750. In step 750 the sensor data generated by electronic device 100 is adjusted to take into account the variations in sensor data detected in step 730. The sensor data adjustment continues to be applied to new data generated until the time when electronic device 100 is again inside the area monitored by stationary device 110, at which point the sensor calibration process 700 is restarted, or the sensor data adjustment is terminated by an external actor, arbitrary rule, or arbitrary time period.

In an exemplary embodiment, if the system detects that the person is not wearing electronic device 100 and the person exits the area monitored by stationary device 170A, or a sub-perimeter of the area monitored by said stationary device, then the system alerts the person that the person is not wearing the wearable electronic device 100. The purpose of the alert is to remind the person to put on the wearable electronic device 100 before leaving the area monitored by the stationary device.

In an exemplary embodiment, event detection process 172 is running in a separate device that is in communication with both stationary device 170A and electronic device 100.

In an exemplary embodiment, sensor fusion process 175 is running in a separate device that is in communication with both stationary device 170A and electronic device 100.

In an exemplary embodiment, the event detection software module 110 monitors health sensors, such as those in sensor 112 (e.g. thermometer, heart rate monitor, oximeter, glucose meter etc.) in addition to movement sensors 101 (e.g. accelerometer, magnetometer etc.).

In an exemplary embodiment, an animate object is monitored instead of a person.

In an exemplary embodiment, the data collection and data processing by the monitoring system may use any of the methods and, or, sensors disclosed in U.S. patent application Ser. No. 13/840,155 or U.S. patent application Ser. No. 14/569,063, the disclosures of each of the foregoing applications being incorporated herein by reference in their entirety.

Many further variations and modifications will suggest themselves to those skilled in the art upon making reference to the above disclosure and foregoing illustrative and inter-related embodiments, which are given by way of example only, and are not intended to limit the scope and spirit described herein.

The invention claimed is:

1. A process for operation of an electronic device, comprising the steps of:
sending an automatic signal input to a software module contained within said electronic device, said automatic signal input being received from a sensor, wherein the sensor provides readings of parameters of a person's movements;
automatically detecting abnormal behavior by said person;
detaching said electronic device from said person;
sending a second signal input to said software module that interrupts said software module from detecting from the received readings an abnormal behavior by said person when said electronic device is detached from the body of said person, wherein said second signal input is immediately sent to said software module upon said detachment of said electronic device,
wherein said software module for automatic detection of abnormal behavior, further comprises a continuous deduction protocol to deduce a likely activity being performed or the associated likelihood of the occurrence, or non-occurrence, of a possible adverse event.

2. The process of claim 1, wherein sending an automatic signal input further comprises sensing when said electronic device is attached to an article that is designed to be worn on the body of said person.

3. The process of claim 2, wherein sensing when said electronic device is attached to said article further comprises sensing when a piece of said article is used to attach said electronic device to said article.

4. The process of claim 2, wherein sensing when said electronic device is attached to said article further comprises sensing when said article and said electronic device are within a pre-specified distance.

5. The process of claim 1, wherein said automatic signal input further comprises an input from sensing when an article, that is designed to be worn on the body of a person and that contains said electronic device, is attached to said person.

6. The process of claim 5, wherein sensing when said article is attached to the body of said person further comprises sensing when a piece of said article is used to attach said article to said person.

7. The process of claim 1, wherein said automatic signal input further comprises an input from sensing when an article, that is designed to be worn on the body of a person and that contains one, or more, of said sensors, is attached to said person.

8. The process of claim 7, wherein sensing when said article is attached to the body of said person further comprises sensing when a piece of said article is used to attach said article to said person.

9. The process of claim 1, wherein said automatic signal input is done through the closing, or opening, of an on/off switch mechanism.

10. The process of claim 1, wherein at least one sensor is part of said article.

11. The process of claim 1, wherein at least one sensor is part of said electronic device.

12. The process of claim 1, wherein at least one of said sensors are located on said person's torso.

13. The process of claim 1, wherein at least one of said sensors are located on at least one of said person's limbs.

14. The process of claim 1, wherein said readings for at least one parameter further comprises one of at least speed, direction, orientation, horizontal location, vertical height, and time of observation of said person's movements.

15. The process of claim 1, wherein said readings further comprise readings for a non-movement health parameter of said person.

16. The process of claim 1, wherein said readings from a sensor further comprise: a second set of received readings from at least one stationary sensor that gathers readings of parameters of said person's body movements.

17. The process of claim 1, wherein said readings from a sensor further comprise: a second set of received readings from at least one stationary sensor and a deduction protocol to deduce if said person exits a perimeter monitored by said sensors without wearing said electronic device; and, alerting said person that he/she is not wearing said electronic device.

18. The process of claim 1, wherein said deduction protocol in said software module for automatic detection of abnormal behavior adapts a frequency, or intensity, of data collection, or data processing, so that if the likelihood of the occurrence of a future adverse event is below a predefined threshold, then the data collection and the data processing is adapted to conserve energy.

19. The process of claim 1, further comprising attaching at least one of said electronic device and said article in fixed positions in relation to each other and in relation to the axis of the torso of said person.

20. A computing machine for detecting and predicting an event based on changes in behavior of a person comprising:
   a computer memory;
   a sensor; and
   a computer processor in communication with the computer memory and the sensor, wherein the computer processor executes a sequence of instructions stored in the computer memory, including instructions for:
   receiving an automatic signal input when an electronic device is attached to the body of a person;
   initiating in said electronic device a software module for automatic detection of abnormal behavior by said person when said signal input is received;
   receiving readings, in the software module, from one, or more, sensors for parameters of said person's movements;
   detecting in the software module, from the received readings, abnormal behavior by said person;
   running the software module for automatic detection of abnormal behavior by said person for as long as said electronic device is attached to the body of said person, wherein said software module for automatic detection of abnormal behavior, comprises a continuous deduction protocol to deduce a likely activity being performed or the associated likelihood of the occurrence, or non-occurrence, of a possible adverse event;
   sending a second automatic signal input when said electronic device is detached from the body of said person;
   receiving in said electronic device said second automatic signal input; and
   interrupting said software module for automatic detection of abnormal behavior by said person when said second signal input is received.

* * * * *